(12) United States Patent
Tang

(10) Patent No.: US 7,990,703 B2
(45) Date of Patent: Aug. 2, 2011

(54) ELECTRONIC DEVICE WITH SUPPORT LEGS

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 225 days.

(21) Appl. No.: 12/251,400

(22) Filed: Oct. 14, 2008

(65) Prior Publication Data
US 2009/0316353 A1    Dec. 24, 2009

(30) Foreign Application Priority Data
Jun. 23, 2008    (CN) .................... 2008 1 0302272

(51) Int. Cl.
*G06F 1/16* (2006.01)
(52) U.S. Cl. ......... 361/679.59; 361/679.26; 361/679.27; 361/679.55; 248/688; 312/223.1; 312/223.2
(58) Field of Classification Search ............. 361/679.59; 400/681
See application file for complete search history.

(56) References Cited

U.S. PATENT DOCUMENTS

| | | | | |
|---|---|---|---|---|
| 4,516,508 A * | 5/1985 | Kako et al. | ......... | 108/7 |
| 4,856,748 A * | 8/1989 | Obermeyer | ......... | 248/688 |
| 5,297,003 A * | 3/1994 | Nomura et al. | ......... | 361/679.12 |
| 5,732,928 A * | 3/1998 | Chang | ......... | 248/688 |
| 5,823,504 A * | 10/1998 | Kuwajima | ......... | 248/685 |
| 6,485,209 B2 * | 11/2002 | Oura et al. | ......... | 400/681 |
| 6,654,237 B1 * | 11/2003 | Lee | ......... | 361/679.55 |
| 6,682,240 B1 * | 1/2004 | Chou | ......... | 400/691 |
| 7,001,088 B2 * | 2/2006 | Hui-hu | ......... | 400/681 |
| 7,079,383 B2 * | 7/2006 | Homer | ......... | 361/679.35 |
| 7,104,516 B2 * | 9/2006 | Uto et al. | ......... | 248/688 |
| 7,111,948 B2 | 9/2006 | Lee et al. | | |
| 7,415,108 B2 * | 8/2008 | Toh | ......... | 379/445 |
| 7,542,276 B2 * | 6/2009 | Chang | ......... | 361/679.59 |
| 7,566,043 B2 * | 7/2009 | Chen | ......... | 248/616 |
| 2003/0179543 A1 * | 9/2003 | Sri-Jayantha et al. | ......... | 361/683 |
| 2007/0103859 A1 * | 5/2007 | Yu | ......... | 361/683 |

* cited by examiner

*Primary Examiner* — Jayprakash N Gandhi
*Assistant Examiner* — Anthony Q Edwards
(74) *Attorney, Agent, or Firm* — Clifford O. Chi (57) ABSTRACT

An electronic device includes a housing and two supporting mechanisms. The housing includes a base plate and two sloping slide portions. The sloping slide portions are formed at two adjacent corners of the base plate. Each sloping slide portion has a sloping plate being oblique to the base plate. Each supporting mechanism includes a support leg. Each of the support legs is slidably connected to the sloping plate. An altitude of each of the support legs relative to the base plate is capable of being changed when the support leg moves relative to the sloping plate.

14 Claims, 7 Drawing Sheets

ELECTRONIC DEVICE WITH SUPPORT LEGS

BACKGROUND

1. Field of the Invention

The present disclosure generally relates to electronic devices, and particularly to an electronic device with a main body and a rotatable display body.

2. Discussion of the Related Art

Notebook computers have become popular alternatives to desktop computers because of their portability. A typical notebook computer includes a display body and a main body with a keyboard. The display body is rotatably attached to the main body so that the display body can be opened and closed relative to the main body. In most circumstances, the typical notebook computer is operated on a tabletop. However, the keyboard is usually parallel to the tabletop making it very uncomfortable for a user to operate the notebook. In addition, the main body of the notebook computer is in contact with the tabletop. Heat produced by internal electronic components cannot be dispersed efficiently from the main body of the notebook, even though the notebook has a fan for heat dissipation. As a result, the internal electronic components may be damaged from overheating. Accordingly, a notebook computer which can solve the above-described problems is needed.

One such notebook computer has a keyboard popped up away from a main body of the notebook computer and slanted relative to the main body may feel comfortable for the user to operate the keyboard. In addition, a gap for emitting heat is formed between the keyboard and the main body.

However, dust and harmful substances may easily get inside the main body through the gap and deposit on the internal electronic components. This may cause a short circuit of the internal electronic components, and make it difficult to disperse the heat produced by the internal electronic components.

Therefore, an electronic device which overcomes the above-described shortcomings is desired.

SUMMARY

An electronic device includes a housing and two supporting mechanism. The housing includes a base plate and two sloping slide portions. The sloping slide portions are formed at two adjacent corners of the base plate. Each sloping slide portion has a sloping plate being oblique to the base plate. Each supporting mechanism includes a support leg. Each of the support legs is slidably connected to the sloping plate. An altitude of each of the support legs relative to the base plate is capable of being changed when the support leg moves relative to the sloping plate.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION

References will now be made to the drawings to describe certain inventive embodiments of the present electronic device, in detail.

Figure 1:
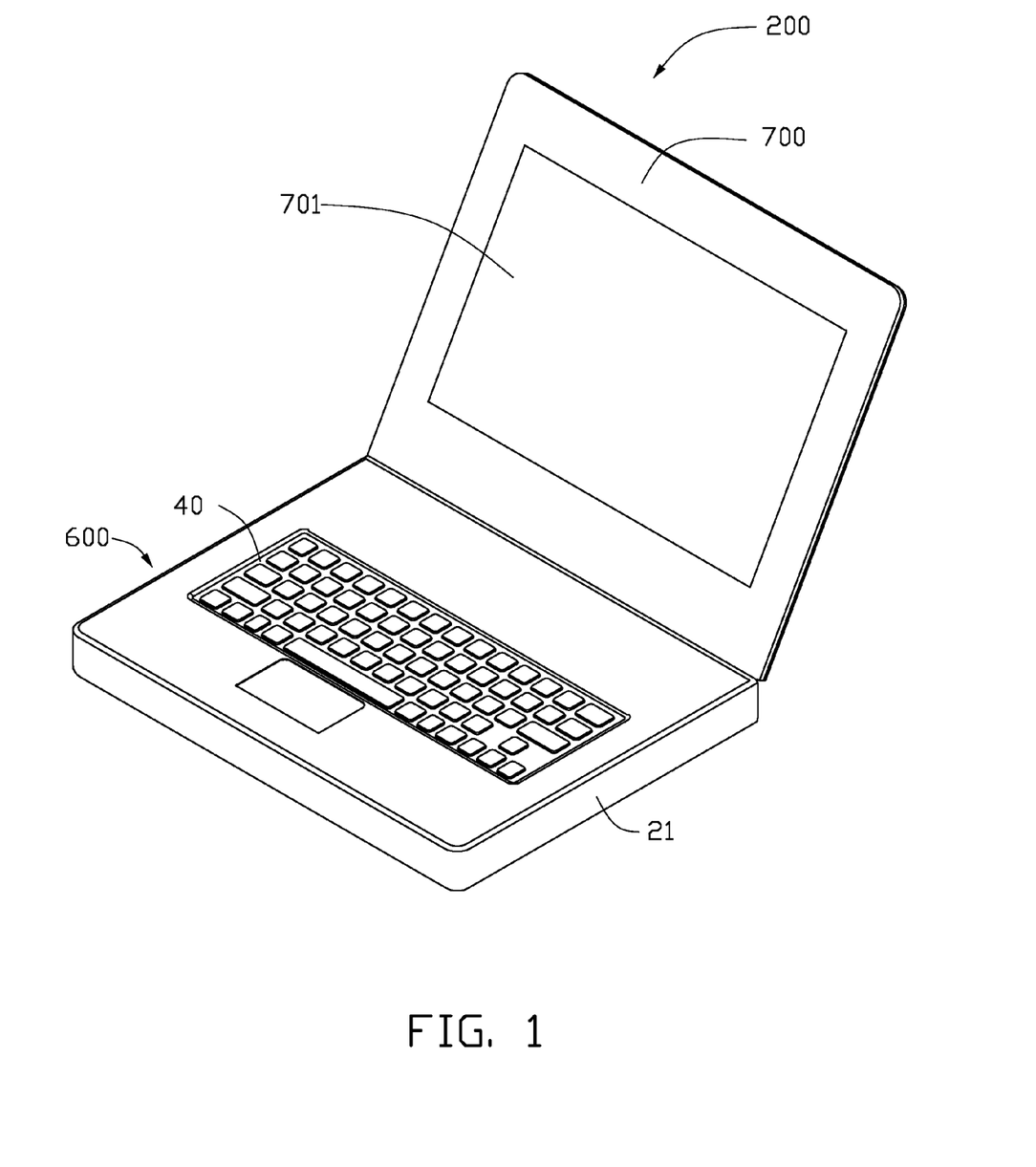
FIG. 1 is a schematic, isometric view of a notebook computer of the present application.
Figure 2:
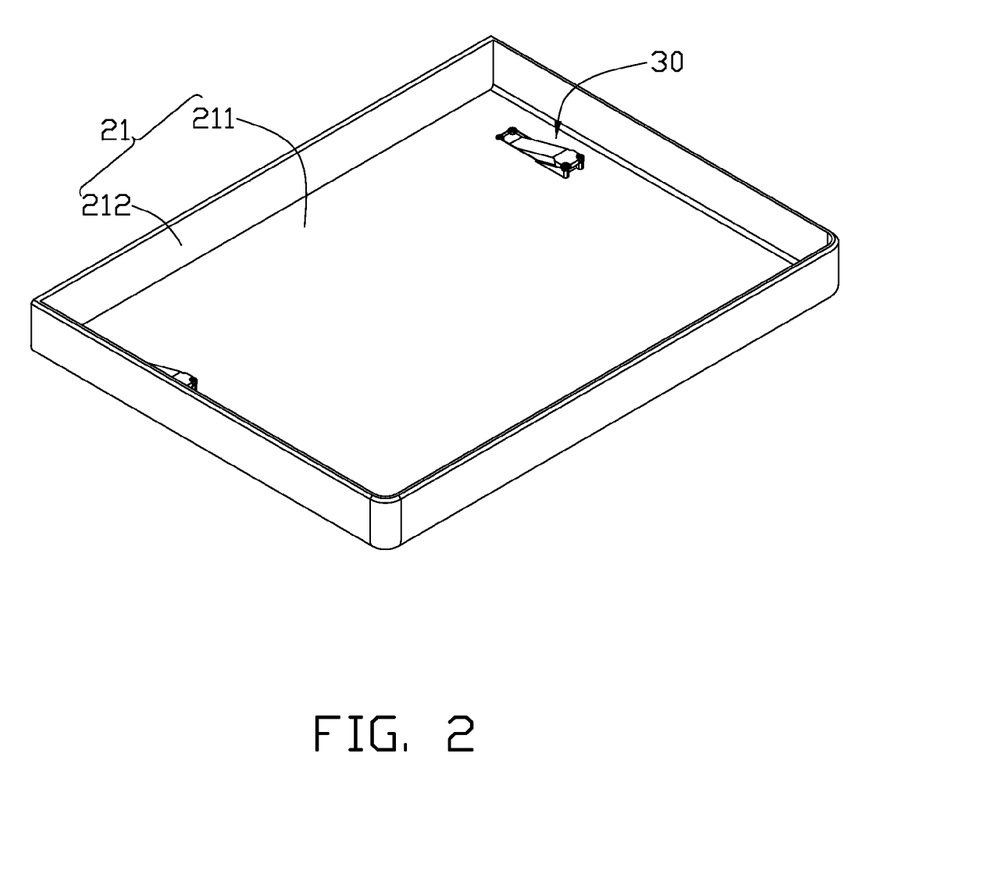
FIG. 2 is an isometric view of the notebook computer of FIG. 1, showing only a housing of the notebook computer and two supporting mechanisms.

Referring to FIGS. 1 and 2, a notebook computer 200 in accordance with an embodiment of the present disclosure is shown. The notebook computer 200 includes a main body 600 and a display body 700. The display body 700 is rotatably connected to the main body 600. The main body 600 includes a housing 21, two supporting mechanisms 30, a keyboard 40, and a plurality of electronic components (not shown). The keyboard 40 is assembled in the housing 21. The supporting mechanisms 30 and the electronic components are disposed in the housing 21 below the keyboard 40. The display body 700 includes a display panel 701.

Figure 4:
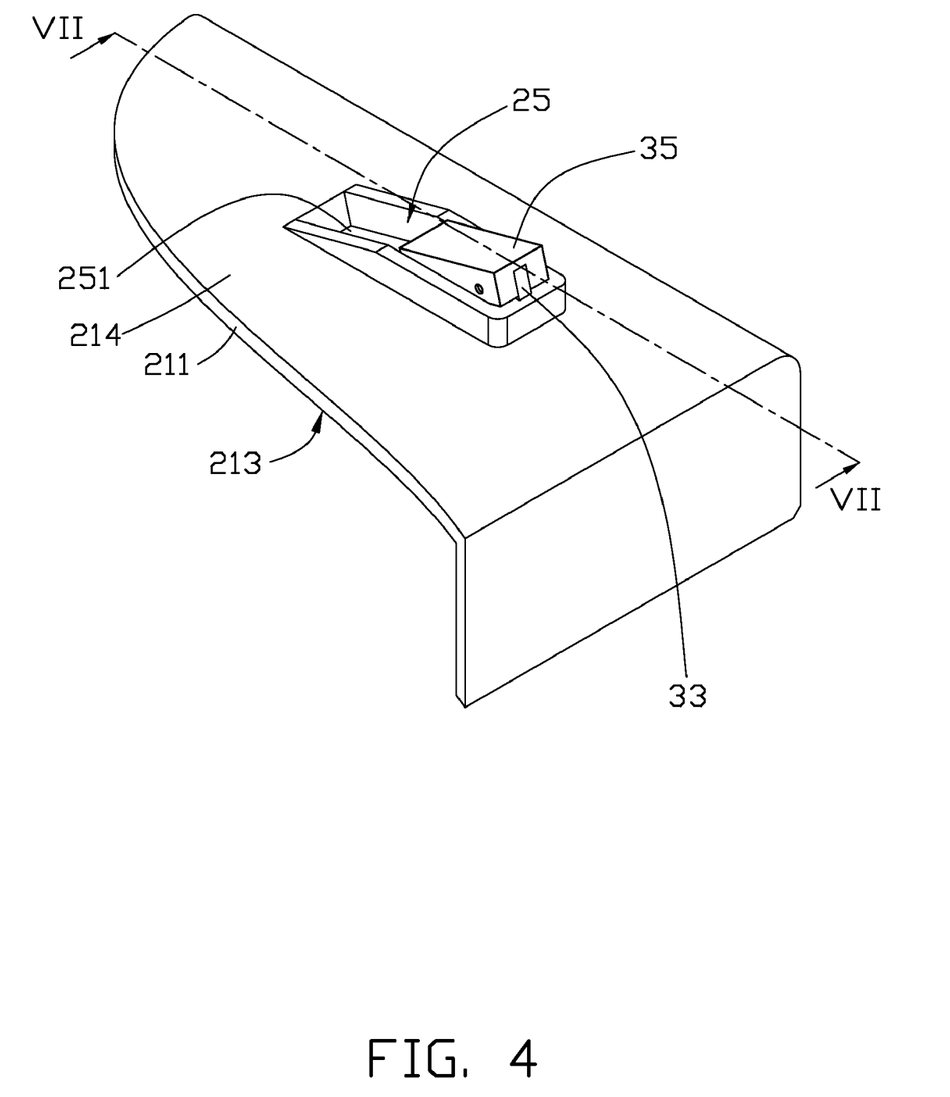
FIG. 4 is similar to FIG. 3, but viewed from a bottom-side up aspect.
Figure 5:
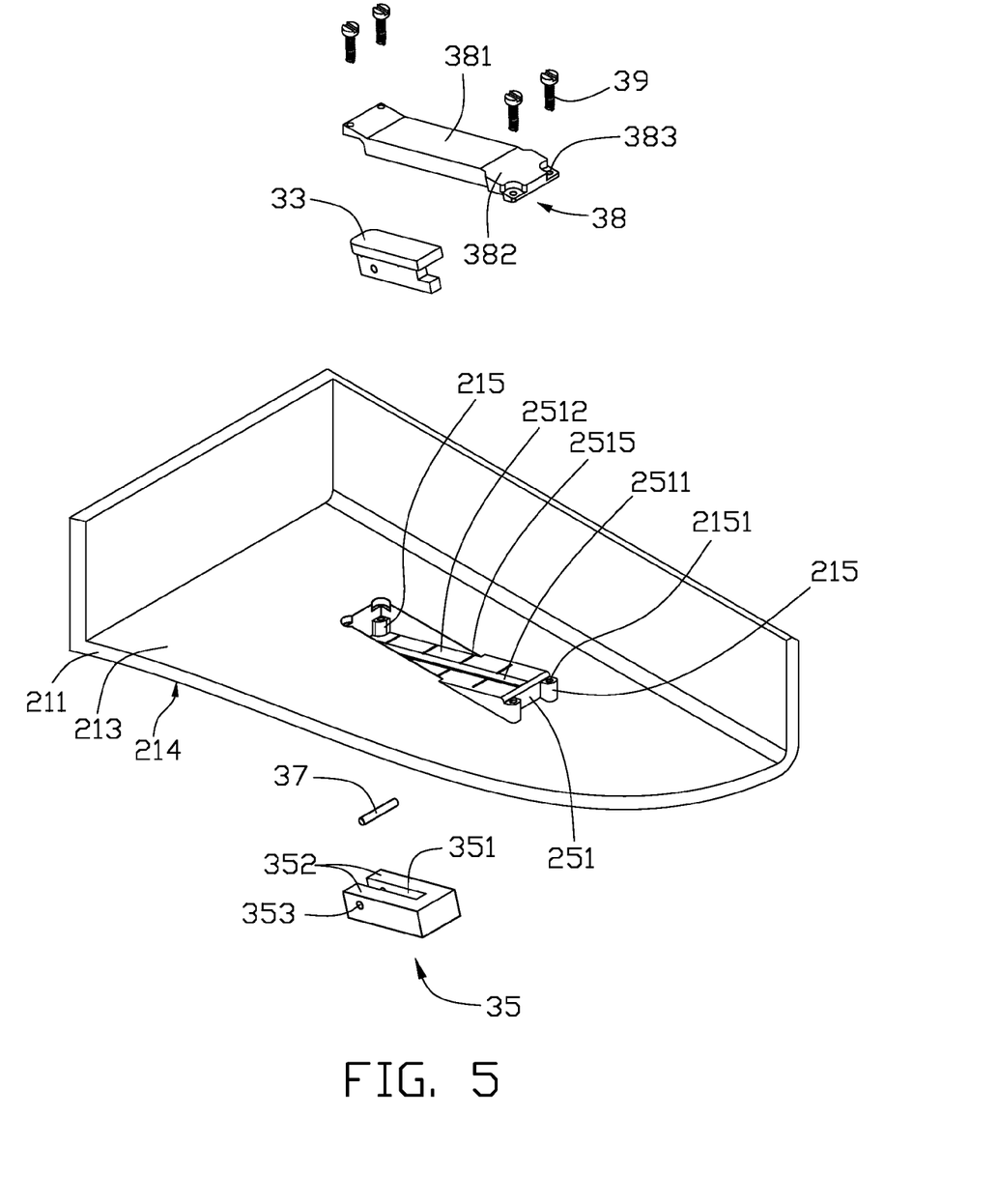
FIG. 5 is an exploded, isometric view of the housing and the supporting mechanism in FIG. 3.
Figure 6:
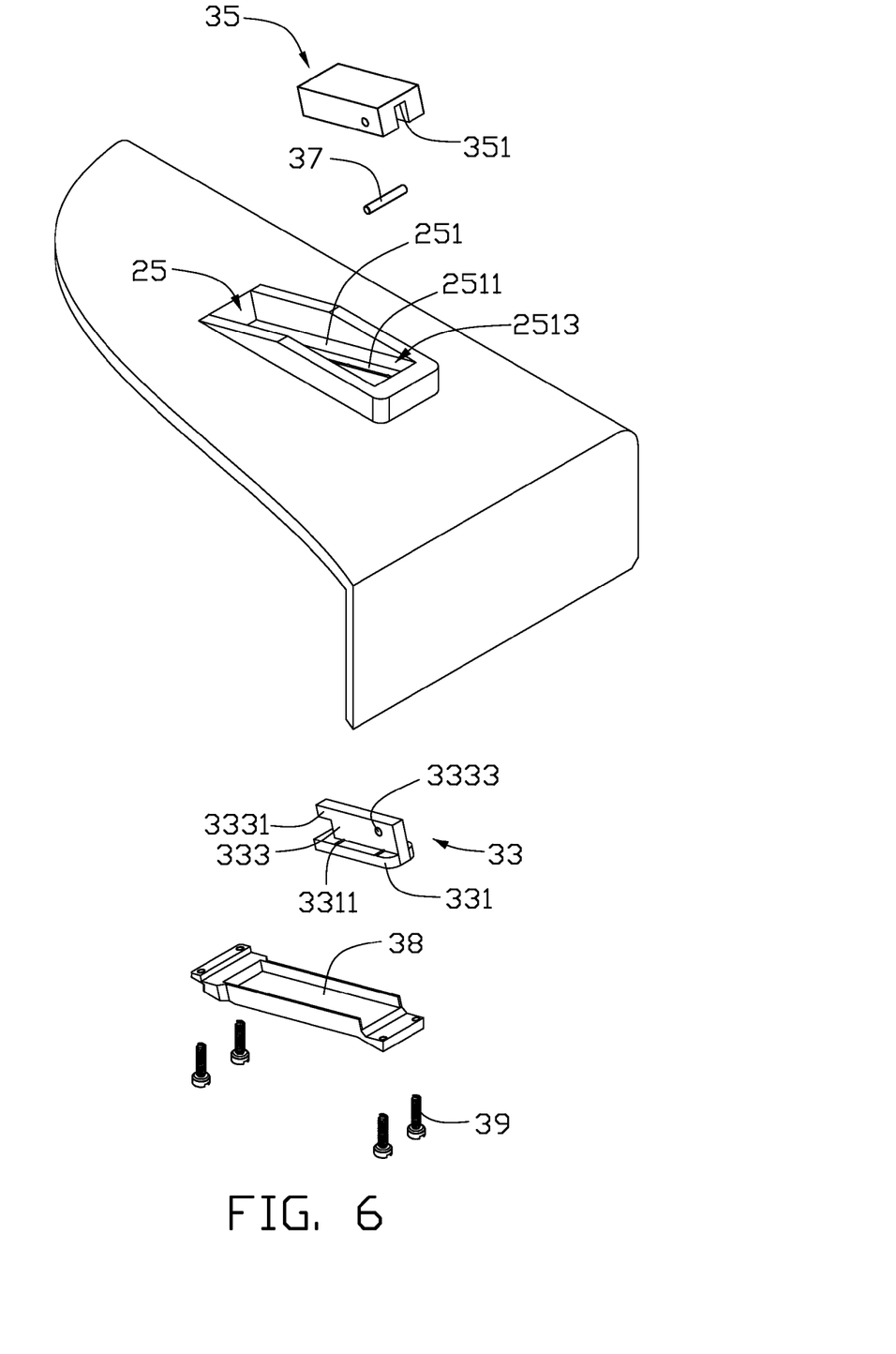
FIG. 6 is an exploded, isometric view of the housing and the supporting mechanism in FIG. 4.

Referring to FIGS. 2, the housing 21 includes a rectangular base plate 211 and four side plates 212 extending substantially perpendicularly from edges of the base plate 211. Referring also to FIGS. 4 through 6, the base plate 211 includes an inside surface 213 facing the keyboard 40 and a bottom surface 214 opposite to the inside surface 213. Two sloping slide portions 25 are correspondingly formed at two corners of the bottom surface 214 of the base plate 211 adjacent a connecting side of the housing 21 and the display body 700. Each sloping slide portion 25 includes a sloping plate 251 oblique to the base plate 211. The sloping plate 251 defines a sliding groove 2511 therein. The sloping plate 251 includes a first surface 2512 facing the keyboard 40 and a second surface 2513 opposite to the first surface 2512. A plurality of restricting bars 2515 are formed on the second surface 2513 of the sloping plate 251. Four fixing poles 215 are formed on the base plate 211 adjacent to four corners of the sloping plate 251 respectively. Each fixing pole 215 defines a threaded hole 2151 in the top surface thereof.

Figure 3:
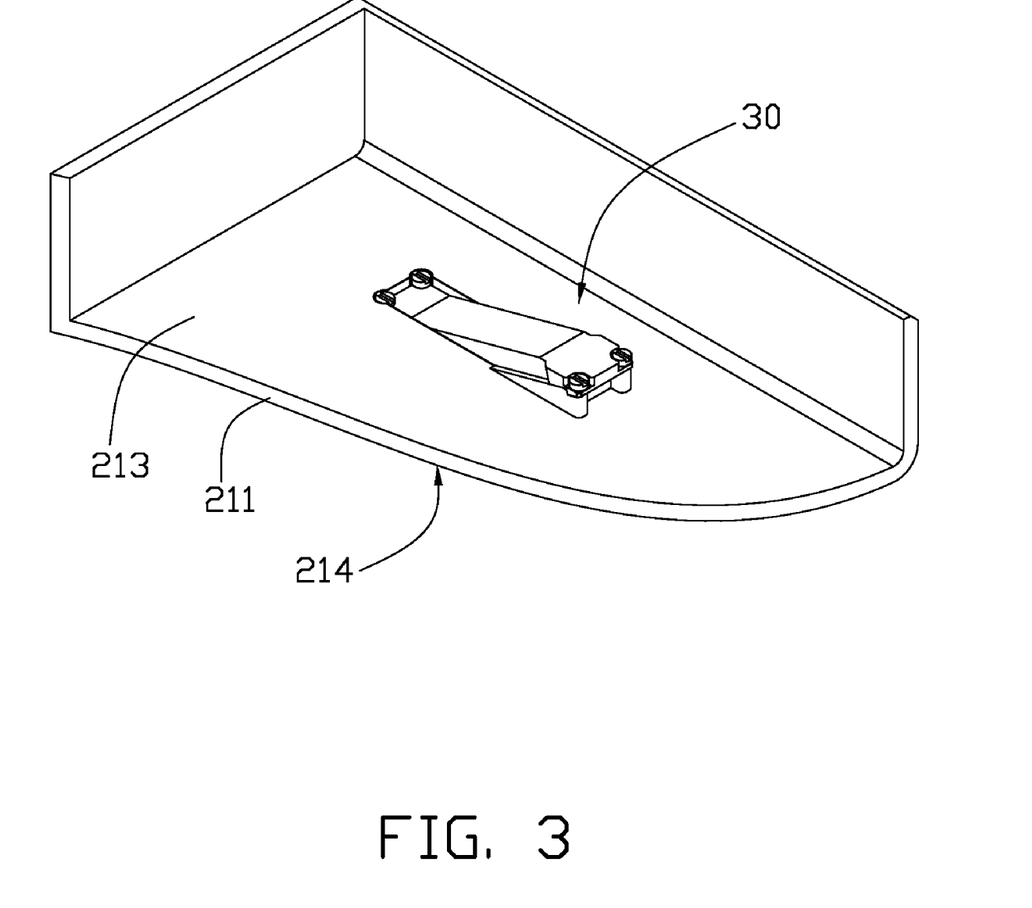
FIG. 3 is a partially, isometric view of the housing of FIG. 2, with one supporting mechanism.

Referring to FIGS. 3, 5, and 6, each supporting mechanism 30 includes a sliding member 33, a support leg 35, a connecting shaft 37, a cover 38, and four fastening members 39.

The sliding member 33 includes a first sliding plate 331 and a second sliding plate 333 perpendicularly extended from the middle portion of the first sliding plate 331. Both the first sliding plate 331 and the second sliding plate 333 are substantially rectangular plates. Two limiting bars 3311 are formed on a surface of the first sliding plate 331 adjacent to the second sliding plate 333. A restricting portion 3331 is formed at a first end of the second sliding plate 333. The second sliding plate 333 also defines a pivotal hole 3333 at a second end of the sliding plate that is opposite to that of the first end.

The support leg 35 is rectangularly shaped. The support leg 35 defines a rectangular positioning groove 351 in the middle of one end of the support leg 35. The support leg 35 also includes two sidewalls 352 defining the positioning groove 351. The sidewalls 352 are opposite to each other, and each of the two sidewalls 352 defines a positioning hole 353 therein. The connecting shaft 37 is configured for connecting the sliding member 33 with the support leg 35.

The cover 38 includes a rectangular main plate 381 and two fixing pieces 382 extended from opposite ends of the main plate 381. Each fixing piece 382 defines two fixing hole 383 at a free end away from the main plate 381.

Referring to FIGS. 4 through 7, when assembling one of the supporting mechanisms 30 to the housing 21, the second sliding plate 333 of the sliding member 33 extends through the sliding groove 2511 of the sloping plate 251 from the inside surface 213, and engages in the positioning groove 351 of the support leg 35. The connecting shaft 37 extends through the positioning hole 353 of one sidewall 352, the pivotal hole 3333 of the sliding member 33, and the positioning hole 353 of the other sidewall 352. Therefore, the support leg 35 and the sliding member 33 are fixed together. Each fastening member 39 extends one corresponding fixing hole 383 of the cover 38, and screws into the threaded hole 2151 of one corresponding fixing pole 215, thus fixing the cover 38 to the housing 21. The other supporting mechanism 30 is assembled to another part of the housing 21, according to the above-described assembling steps. After that, each support leg 33 is positioned on a bottom end of the sloping slide portions 25 such that the support leg 33 is fully received in the sloping slide portions 25. The limiting bars 3311 of the sliding member 33 engage with two adjacent restricting bars 2515 of one end of the sloping plate 251, thus positioning the support leg 33 at the bottom end of the sloping slide portions 25. At this time, the notebook computer 200 is in a lowered state. In other words, the main body 600 is not supported by the support legs 33.

Figure 7:
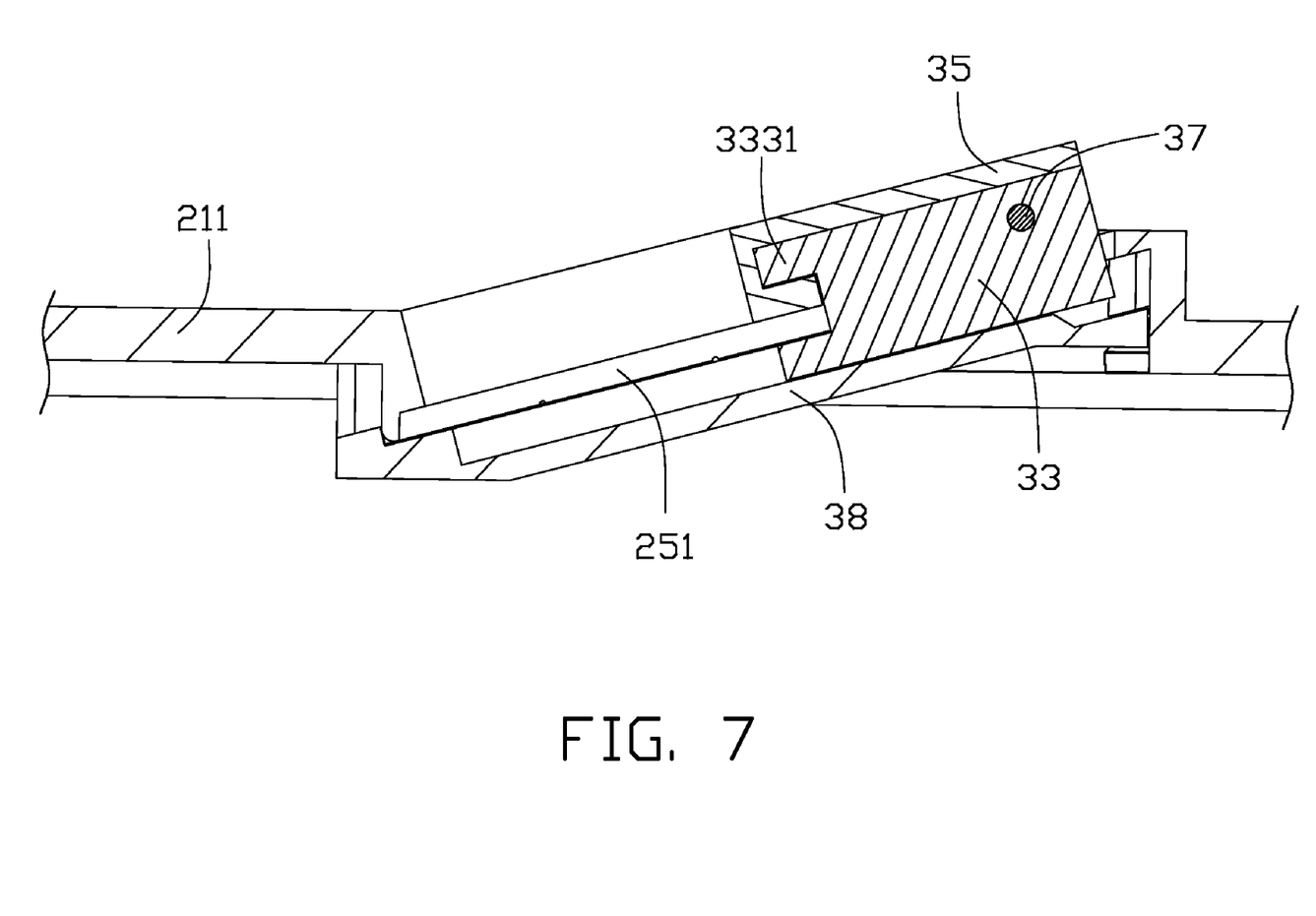
FIG. 7 is a partial cross-sectional view of the housing and the supporting mechanism of FIG. 4 taken along the line VII-VII, with a support leg in a raised state.

The notebook computer 200 can be changed from the lowered state to a raised state by pushing each support leg 35 to slide to a top end of the sloping slide portion 25 until the limiting bars 3311 of the sliding member 33 engage with two adjacent restricting bars 2515 of the other end of the sloping plate 251. As a result, the main body 600 of the notebook computer 200 is lifted and supported at an inclined angle by the support legs 35. That is, a spacious gap with a maximum height of 2 centimeters is formed between the base plate 211 of the housing 21.

In the raised state, the notebook computer 200 is inclined at an angle such that the lifted side of the notebook computer 200 is above a supporting area such as a tabletop, operating the keyboard 40 would be more comfortable. In addition, heat can be radiated from the bottom surface 214 through the spacious gap defined between the main body 600 and the supporting area. Accordingly, the heat given off or generated by the electronic components can be dispersed more efficiently. The support legs 35 are conveniently exposed outside the main body 600 and can be pushed quickly and easily to the top end of the sloping slide portion 25 and tilt the notebook computer 200.

It should be understood that, the notebook computer 200 may include only one of the supporting mechanisms 30. In that case, the supporting mechanism 30 is preferably disposed on the middle of one side of the housing 21. The notebook computer 200 may include three or more supporting mechanisms 30. The support leg 35 and the sliding member 33 can be fixed together via other connecting members, such as a screw. The sloping slide portions can also be formed on other electronic devices, such as a personal digital assistant (PDA).

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising:
a housing having a base plate and at least one sloping slide portion formed on the base plate, each of the at least one sloping slide portion having a sloping plate being oblique to the base plate; and
at least one supporting mechanism having a support leg slidably connected to the sloping plate, wherein an altitude of the support leg of the at least one supporting mechanism is capable of being changed when the support leg slides parallel to the sloping plate;
wherein each of the at least one supporting mechanism further comprises a sliding member fixed to the support leg, the sliding member and the support leg are positioned on opposite sides of the sloping plate, the sliding member comprises a first sliding plate and a second sliding plate perpendicularly extended from a middle portion of the first sliding plate, the sloping plate defines a sliding groove, the second sliding plate of the sliding member extends through the sliding groove and engages with the support leg.

2. The electronic device of claim 1, wherein a restricting portion is formed at one end of the second sliding plate, the support leg defines a positioning groove, the restricting portion engages in the positioning groove of the support leg.

3. The electronic device of claim 1, wherein each of the at least one supporting mechanism further comprises a connecting shaft extending through the sliding member and support leg so as to fix the support leg to the sliding member.

4. The electronic device of claim 1, wherein a plurality of limiting bars are formed on the sliding member, a plurality of restricting bars are formed on the sloping plate, the plurality of the limiting bars engage with the restricting bars so as to make the sliding member non-slidably on the sloping plate.

5. The electronic device of claim 1, wherein each of the at least one supporting mechanism further comprises a cover, the cover is fixed to the base plate and covering the sliding member.

6. The electronic device of claim 5, wherein the cover defines four fixing holes at four corner thereof, each of the four fixing poles are formed on the base plate adjacent to four corners of the sloping plate respectively, each of the four fixing poles defining a threaded hole on a top surface thereof, each of the at least one supporting mechanism further comprises four fastening members, each of the fastening members extending through one corresponding fixing hole of the cover, and screw into one corresponding threaded hole of the fixing pole.

7. The electronic device of claim 1, wherein the at least one supporting mechanism comprises two sloping slide portions; the two sloping slide portions are formed in two adjacent corners of the base plate; a number of the at least one support leg is two; each support leg is slidably connected to the sloping plate of the sloping slide portion.

8. The electronic device of claim 1, further comprising a display body rotatably connected to the housing.

9. The electronic device of claim 8, wherein the at least one supporting mechanism comprises one sloping slide portion; the sloping slide portion is formed in the middle of one side of the base plate.

10. The electronic device of claim 1 being a notebook computer.

11. The electronic device of claim 10, further comprising a keyboard positioned in the housing.

12. The electronic device of claim 1, wherein the housing further comprises a plurality of side plates extending perpendicularly from edges of the base plate.

13. An electronic device, comprising:
a housing having a base plate and at least one sloping slide portion formed on the base plate, wherein each of the at least one sloping slide portion comprises a sloping plate slanted relative to the base plate; and
at least one supporting mechanism having a support leg slidably connected to the sloping plate and slidable parallel to the sloping plate to be positioned at different positions relative to the sloping plate;
wherein each of the at least one supporting mechanisms further comprises a sliding member fixed to the support leg, the sliding member and the support leg are positioned on opposite sides of the sloping plate, a plurality of limiting bars are formed on the sliding member, a plurality of restricting bars are formed on the sloping plate, the limiting bars selectably engage with some of the restricting bars so as to make the sliding member non-slidable at different positions relative to the sloping plate.

14. The electronic device of claim 13, wherein the at least one supporting mechanism comprises two sloping slide portions; the two sloping slide portions are formed in two adjacent corners of the base plate; a number of the at least one support leg is two; each support leg is slidably connected to the sloping plate of the sloping slide portion.

* * * * *